Sept. 20, 1932.  O. J. LEINS ET AL  1,878,938
THERMALLY OPERATED DEVICE
Filed Aug. 12, 1929  2 Sheets-Sheet 1
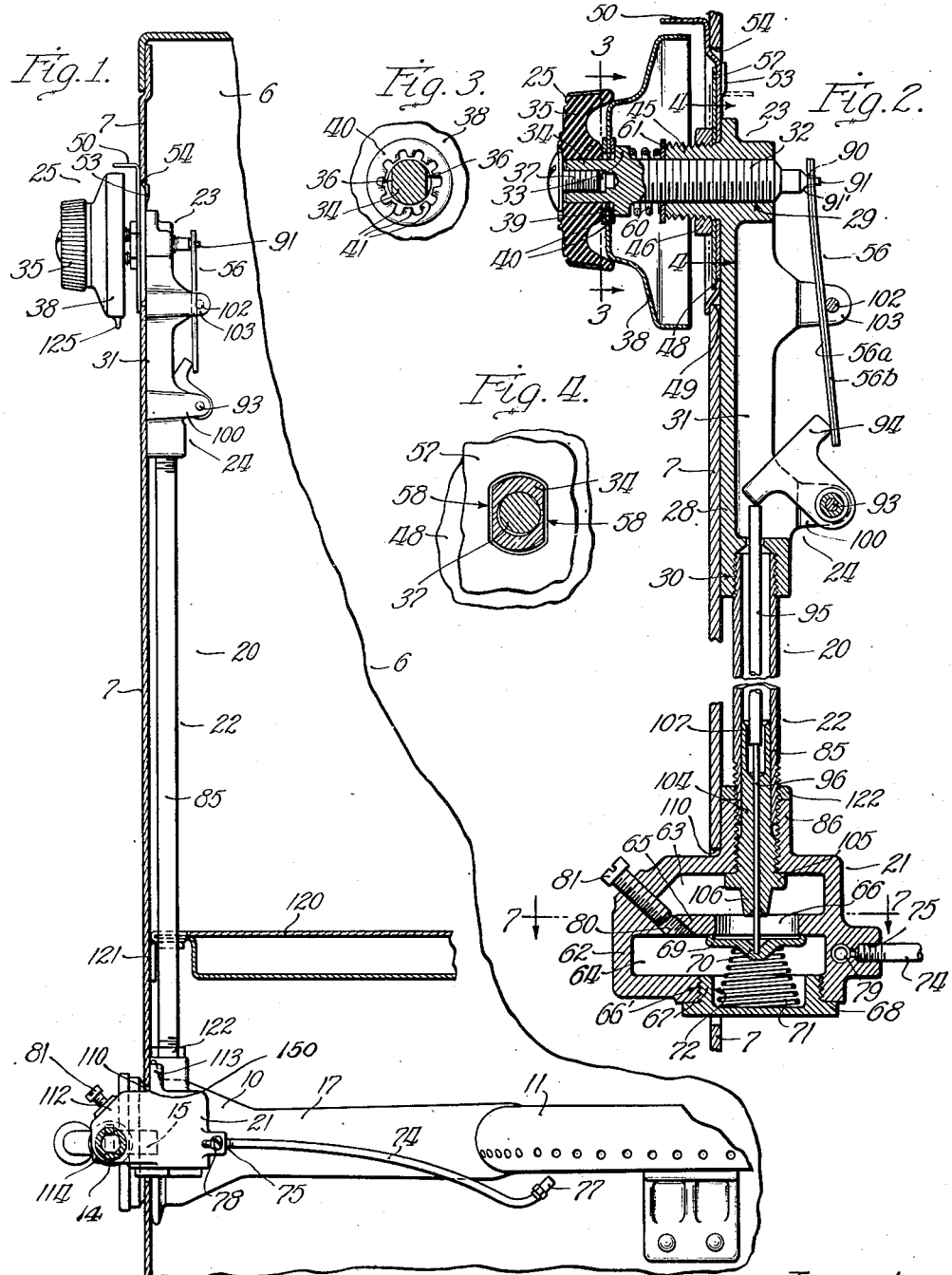
Inventors:
Oscar J. Leins
Clarence Wantz
By Brown, Jackson, Boettcher & Dienner
Attys.

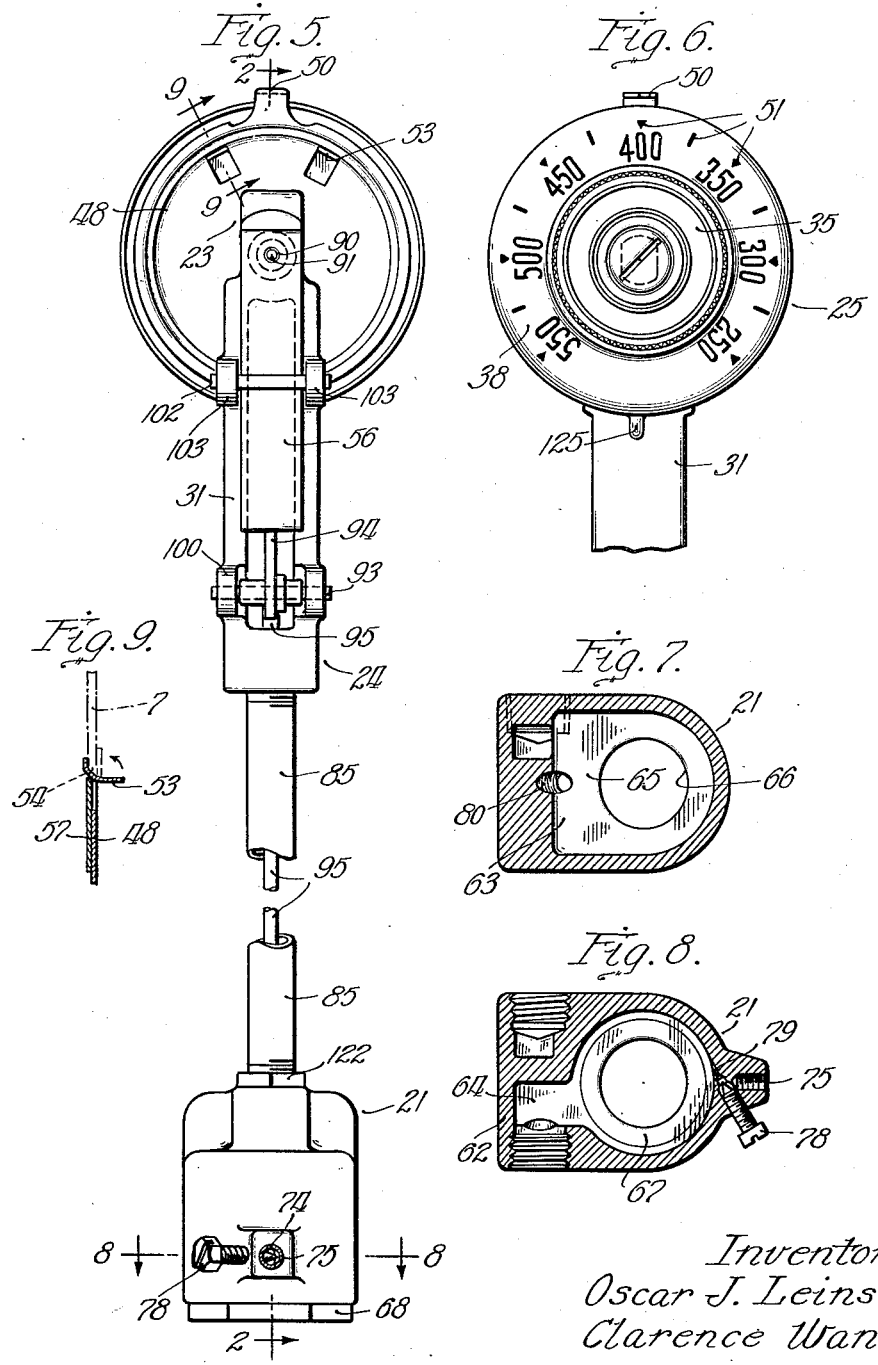

Patented Sept. 20, 1932

1,878,938

UNITED STATES PATENT OFFICE

OSCAR J. LEINS AND CLARENCE WANTZ, OF MILWAUKEE, WISCONSIN, ASSIGNORS TO CLAUS MANUFACTURING CO., OF MILWAUKEE, WISCONSIN, A CORPORATION OF WISCONSIN

THERMALLY OPERATED DEVICE

Application filed August 12, 1929. Serial No. 385,425.

Our invention relates to thermally operated devices.

While the particular device which we shall describe hereinafter in connection with the drawings is a thermally operated device for use with the oven heat regulator of the co-pending application of Oscar J. Leins and Howard C. Rawlings, case 1, filed of even date herewith, it is to be understood that it is not limited to such use, but may be employed in all similar work.

The positioning and mounting of the thermal sensitive member in a device of this sort is of primary importance. If the positioning and mounting of this member causes binding, warping, bending, twisting, or otherwise interferes with its free warping properties, variables are introduced which are difficult to screen out or compensate for, and it becomes difficult to standardize the resulting movement or functioning of the device when subjected to heat.

If, on the other hand, the thermal sensitive member is positioned and mounted so that it will function without binding or other interference with its free warping properties or movement when subjected to heat, there will be no variables introduced or impairment of the action of the device and it may be accurately standardized.

The present invention has for its primary object to employ the thermal sensitive member in such a way that it will be positioned and supported for functioning without binding or interfering in any way with its free warping properties or movement when subjected to heat.

Another object of our invention is to provide means for supporting and harnessing the movement of the thermal sensitive member which will permit the use of less thermal sensitive metal and which will at the same time provide relatively great movement for operating the gas valve or other controlling device, for example, so that the speed of travel of the valve or other device actuated by the thermally operated device will be relatively high assuring in an oven heat regulator operation of the device with a short heating period and assuring an abrupt closing off of the heating medium when the desired temperature has been attained. The present invention provides for accomplishing this without the use of reduction gears or threads, the pitch of the threads found in standard supplies being unsuited for this purpose.

It is well known that in oven heat regulators the thermal sensitive member must be capable of hand control for the purpose of selecting particular temperatures for particular purposes. The present invention contemplates adapting the thermal sensitive member for such control.

The present invention also contemplates supporting the thermally sensitive member upon the selecting or motion transmitting means cooperating therewith and preferably by suspension upon the selecting means. This eliminates additional supports as well as any impairment of the action of the thermally sensitive member thereby.

It would appear that certain features of our invention are useful, be the device operated by the thermally operated device a heating medium controlling device or some other device. Where this device is a heating medium controlling device, the heating medium may be gas, oil or electric current. More specifically, the invention is adaptable to ovens heated by gas or oil, and still more specifically to ovens heated by gas. Since we contemplate our invention as relating especially to gas ovens, and since all of its features are useful therein, we have shown the present invention in connection with the oven heat regulator of the application of Oscar J. Leins and Howard C. Rawlings, above referred to.

Another object of this invention is to provide a quick and easy adjustment of the dial so that the temperature, as shown on the dial will conform to the actual temperature in the oven, in case of a variance between the two.

The invention is illustrated in the accompanying drawings, in which:

Fig. 1 is a fragmentary vertical section through the wall of an oven and showing in elevation therein a regulator unit assembly embodying our present invention;

Fig. 2 is a vertical section through the regulator unit assembly on the line 2—2 of Fig. 5;

Fig. 3 is a fragmentary detail section taken on the line 3—3 of Fig. 2;

Fig. 4 is a fragmentary detail section taken on the line 4—4 of Fig. 2;

Fig. 5 is an elevational view of the back or rear side of the regulator unit assembly showing the thermally operated device in rear elevation;

Fig. 6 is a fragmentary view showing, in front elevation, the temperature selecting device;

Fig. 7 is a horizontal section taken on the line 7—7 of Fig. 2;

Fig. 8 is a horizontal section taken on the line 8—8 of Fig. 5; and

Fig. 9 is a fragmentary detail section taken on the line 9—9 of Fig. 5.

In the illustrated embodiment of the invention, the wall 7 is the inner side wall of the oven 6 of a gas range. The gas or other heating medium supply pipe (not shown) is connected by the tube means 14 with the oven burner 11 through the nipple 15, mixing head 10 and tube 17 connecting the head with the burner.

The regulator forms the subject matter of the copending application of Oscar J. Leins and Howard C. Rawlings, case 1, filed of even date herewith. This regulator, designated in its entirety at 20, comprises an assembled structure consisting of a controlling device 21, an extension 22 and a thermally operated device 23 connected to actuate the controlling device 21 and constituting with said controlling device 21 and extension 22 a unitary assembly in which the thermally operated device 23, controlling device 21 and actuating connection, designated in its entirety at 24, may be accurately brought into proper relationship and calibrated at the factory and the device thereafter installed as a unit assembly without altering the relationship of the parts.

A selecting device 25 is also preferably carried on the extension 22 to constitute a unitary part thereof, and this selecting device is adapted for adjusting the thermally operated device for the purpose of selecting the temperature which the device is adapted to maintain within the oven as desired. The adjusting device is shown as being supported upon the extension 22 with the controlling device 21.

In the illustrated embodiment of the invention, the thermally operated device 23 includes a spindle housing 28 which may be in the form of a metal casting having an internally threaded transverse opening 29 at its upper end and an internally threaded longitudinal opening 30 at its lower end and an intermediate portion 31 generally channel-shaped in transverse section. The adjusting device includes a dial spindle 32 which has threaded engagement in the opening 30. Toward its outer end the spindle 32 has an integral shoulder or flange 33, and outwardly of the shoulder 33 the outer end 34 of the spindle is adapted to receive a dial knob 35, the spindle end 34 being splayed on opposite sides at 36 or otherwise suitably formed, and the opening in the knob 35 being correspondingly formed so that when the knob 35 is mounted upon the end of the spindle it will be splined to turn the spindle 32 with it.

The knob 35 is clamped in place by a dial screw 37 which threads into an internally threaded axial opening in the outer end of the spindle.

The dial 38, which is of circular cupped formation, has an axial opening 39 through which the spindle end 34 is adapted to pass, this opening being small enough so that the spindle portion of the dial will be clamped firmly between the shoulder 33 and the knob 35 when the screw 37 is tightened to clamp the knob 35 and dial 38 firmly in place against the shoulder 33.

For the purpose of holding the dial 38 in its proper calibrated position, and against turning about the spindle, vibration or shakeproof washers 40 are preferably provided, one being interposed between the shoulder 33 and one side of the central part of the dial 38 about the opening 39 and the other being interposed between the knob 35 and the opposite side of the dial. These washers 40 have serrations 41 about the opening therethrough, and the small ears formed by these serrations are struck out of the plane of the washer sufficiently and preferably from both sides to provide a firm gripping action between the parts between which they are interposed.

The spindle housing 28 has an externally threaded nipple 45 extending outwardly, and co-axial with the opening 29 and clamped against the upper end of the housing 28 at the inner end of this nipple 45 is a cover plate 48. The cover plate is clamped against the housing in this manner by a nut 46 threaded upon the nipple 45. The sides of the nipple 45, adjacent the mounting of the cover plate thereon, are preferably splayed or of other irregular formation at 58, and the opening through the cover plate is preferably correspondingly formed to hold the cover plate against turning upon this nipple. The cover plate 48 may be of sheet metal and is shown as of circular or disc form with the central opening fitting over the splayed portion of the nipple 45.

The outer marginal edge of the cover plate 48 is preferably offset or dished outwardly slightly at 49 for a purpose which will hereinafter appear, and at integral lug 50 is turned outwardly from the top of the cover plate and forms a pointer or indicator for cooperation with the dial scale or calibrations 51.

For the purpose of tying the thermally operative device or the upper end of the unit assembly to the oven wall 7, a pair of tying tangs 53 are struck out forwardly from the cover plate 48 and are adapted to be brought into the opening 54 in the oven wall 7 in the positions shown in dotted lines in Fig. 2 and then struck or bent over outwardly against the inner surface of the wall 7 to tie the upper end of the unit assembly thereto. For the purpose of covering the openings from which the tangs 53 are struck, a second disc-like plate 57 of a diameter to fit within the dished portion of the cover plate 48 is clamped between the outer side of the plate 48 and the nut 46.

The knob 35 may be of black composition and the dial of white or other porcelain enamel. The scale 51 comprises suitable markings in terms of temperature graduated circularly about the outer surface of the dial and adapted to be brought selectively into register with the pointer 50 by turning the knob 35 to set the thermally operated device for any desired temperature.

For example, by setting the 250 degree marking of the scale 51 in register with the pointer 50, a temperature of 250 degrees F. will be maintained within the oven 6 by the regulator, and by turning the knob 35 to bring the 500 degree or 550 degree marking into register with the pointer 50, the inner end of the spindle 32 will be projected further inwardly, and by its cooperation with the upper end of the bi-metallic thermostatic strip 56, will set the thermally operated device to maintain a temperature of 500 degrees or 550 degrees F. in the oven.

A coiled spring 60 surrounding the spindle 32 and interposed between the nipple 45 and the shoulder 33 urges the dial spindle outwardly at all times so that in the event of any looseness or wearing loose of the cooperating threads on the spindle and in the opening 29 the threads will be held in tight cooperation in one direction. A washer 61 may be interposed between the nipple 45 and the adjacent end of the spring 60.

The installed regulator may be calibrated with a standard thermometer by placing such a thermometer within the oven with the regulator in place and, in the event of any discrepancy between the thermometer reading and the dial reading of the regulator, the screw 37 may be released sufficiently to release the washers 40 so that the dial 38 may be turned free of the spindle 32 to register the scale marking 51 corresponding to the thermometer reading with the pointer 50. For example, if the thermometer reading is 425° F. and the dial marking 400° F. is in register with the pointer 50 in the setting of the selecting device for maintaining that temperature, this discrepancy of 25 degrees between the regulator setting and the standard thermometer reading may be corrected by releasing the screw 37 and turning the dial 38 in a clockwise direction (Fig. 7) about the spindle 32 and between the washers 40 to register the dial marking 425° with the pointer 50, whereupon the dial is again clamped tightly between the washers 40 and in the desired angular position with reference to the spindle 32 by tightening the screw 37.

The controlling device 21 comprises a valve body 62 cored to provide a pair of internal valve chambers 63 and 64 separated by an integral partition 65 having a valve opening 66 therethrough. The lower chamber 64 has a downwardly opening internally threaded opening 66' closed by a cap 67 which is adapted to be threaded into and from the opening 66' and which has a hexagonal flange or head 68 at its lower end which seats tightly against the bottom of the body portion 62.

The valve opening 66 is controlled by a valve disc 69 having an axially depending portion 70 which fits in the upper reduced end of a generally conical spring 71 interposed between the valve disc 69 and the cap 67 and yieldingly urging the valve disc 69 to its seat formed by the portion of the partition 65 marginally surrounding the opening 66. The cap 67 is recessed at 72 to receive the adjacent enlarged end of the spring 71.

A pilot or lighter tube 74 is threaded at 75 into the valve body 62 and opens into the chamber 64 through a duct 79. The free end of the tube 74 has a pilot tip 77 disposed to maintain a pilot or lighter flame adjacent the burner 11. A threaded metering screw 78 threaded into the valve body and cooperable with the duct 79 leading from the chamber 64 into the pilot tube 74 is adapted for adjusting or regulating the pilot flame at will.

In the illustrated embodiment of the invention, the connecting tube 14 between the supply pipe 9 and the supply nipple 15 for the burner 11 is made in two sections. The section leading from the supply pipe 9 leads to the valve chamber 64 and the other section leads from the valve chamber 63 to the supply nipple 15. For the purpose of always maintaining at least some supply of gas from the chamber 64 to the chamber 63, and, therefore, to the burner 11 when the valve 16 is open so that the burner 11 cannot be extinguished by the regulator with the valve 16 open, a by-pass passage 80 connects the chambers 63 and 64.

A metering screw 81 threaded into the valve body and cooperable with the passage 80 is adapted for metering or regulating this passage and the fuel supply to the passage 63 therethrough.

The extension 22 comprising a tube 85 threaded at its upper end into the opening 30 of the spindle housing 28 and at its lower end into an integral hub 86 on the top of the valve body 62. This tube 85 joins the valve body and the spindle housing and thermally operated device carried thereby into a unitary assembly.

The present invention is directed to the thermally operated device designated in its entirety at 83, and particularly to the construction, positioning and mounting of the thermal sensitive member 56 and to the means for taking off or transmitting the action or movement of this member therefrom.

The thermostat strip or thermal sensitive element 56 is of bi-metallic formation comprising two generally rectangular laminations 56a and 56b of different ratio expansional materials. One end of this strip 56 has an opening 90 forming an eye which the reduced inner end 91 of the spindle 32 enters.

The engagement of the reduced end 91 of the spindle 32 in the opening 90 is preferably relatively loose so as not to interfere with the action of the thermostatic member 56 which is by the engagement of this reduced end 91 in the opening 90 suspended on the inner end of the spindle 32. The suspended support of the thermally sensitive member and particularly the free suspended support of this member on the spindle 32 of the selecting device are also important aspects of this invention.

Turning of the knob 35 in a clockwise direction (Fig. 7) threads the spindle 32 inwardly and the inner end of the spindle by its shouldered cooperation at 91' with the upper end of the thermal sensitive member 56 tilts this member about the pin 102 as a fulcrum in a clockwise direction (Fig. 3) swinging the lower end of the thermal sensitive member against the head 94 of the rocker arm 92 which is turned in a counterclockwise direction upon its pivot 93 thereby and through the rod 95 and stem 96 moves the valve 69 away from its seat. Turning of the knob 35 in the opposite direction threads the spindle 32 outwardly, whereupon the spring 71 moves the valve 69 toward its seat and swings the thermal sensitive member 56 in the opposite direction about the fulcrum 102 to hold the upper end of the thermal sensitive member in cooperation with the spindle 32. In this manner turning of the knob 35 provides a valve opening corresponding with the setting of the dial 38 and thereby provides for obtaining a temperature within the oven corresponding to the dial position, and any variation of that temperature will warp or influence the thermal sensitive member in one direction or the other, depending upon whether the variation is an increase in temperature or a decrease in temperature. The action of the thermal sensitive member 56 under any increase or decrease in the temperature by which the regulator is set; will be transmitted through the motion transmitting connection to increase the valve opening or permit decreasing said valve opening by the spring 71 so that the temperature for which the regulator is set will be accurately maintained.

The rocker arm 92 is journaled for rocking movement or oscillation upon a pin 93 and said arm 92 has a T-shaped head 94. One side of this head 94 cooperates with or abuts the lower end of the thermal sensitive element 56 and the opposite end cooperates with or abuts the upper end of a motion transmitting or conveyor rod 95.

The rod 95 extends down through the tube 85 and its lower end abuts a valve pin 96, the lower end of which, in turn, engages the valve disc 69 in a recess therein as shown, and is adapted to unseat the valve disc an amount governed by the setting of the spindle or selecting device 32. With this valve disc 69 unseated in conformity with the setting of the adjusting device of the regulator, any tendency of the temperature within the oven to exceed the temperature for which the device is set will flex the thermal sensitive strip 56 accordingly and the lower end of the strip 56 will bow inwardly (Fig. 3), permitting the spring 71 to move the valve disc 69 closer to its seat, which reduces the fuel supply to the burner 11 and maintains the desired temperature. If the temperature drops below that for which the device is set, the lower end of the thermal sensitive strip 56 will bow outwardly (Fig. 3), moving the rod 95 and valve pin 96 downwardly to further unseat the valve disc 69.

The pin 93 is supported at its opposite ends in integral side arms 100 on the housing member 28, and the thermal sensitive strip 56 is confined between its ends by a pin 102 extending across the back or inner side of the strip 56 and supported at its opposite ends in integral side arms 103 on the housing member 28. The valve pin 96 is provided with a bushing or bearing member 104 threaded in the integral hub 86 of the valve body and having a flange 105 seating against the bottom side of the top wall of the valve body with an axially depending portion 106.

The flange 105 is of hexagonal or other contour to facilitate threading the bearing member into place. The upper end of the bearing member 104 is counterbored at 107 to receive and guide the lower end of the actuating rod 95.

From the foregoing, it will be apparent that the thermostat element 56, which is composed of two metals having different coefficients of expansion, occupies a position for functioning without binding or interfering in any way with its free warping properties. The constraining of the thermostat element is such that its movement accurately follows the thermal variations only. This manner of constraining and positioning the thermostat eliminates any deformation in any way by warps, bends, twists, or the like, which would introduce variables difficult to screen out and standardize to obtain a standardized thermal action of the element. The resulting element and its positioning and mounting provides a thermostat which is not only highly sensitive, but very accurately follows the thermal changes. The lever 92, together with the supports and fulcrums for harnessing the movement of the thermal sensitive element, provides the maximum movement necessary for manipulating the controlling device 21. The result is, that the valve travel speed is relatively high, assuring actuation with a short heating period and an abrupt closing off of the gas when the desired temperature is attained, is provided for, all without the use of reduction gears, threads or the like, the standard pitches of which are not suitable for this purpose.

The side wall 7 of the oven has, in addition to the opening 54 already referred to, a second opening 110. The valve body 62 of the controlling device 21 is of such configuration that the largest dimension taken in any direction from point 150 of Fig. 1 is less than the diameter of the cover plate 48, so that the opening 54 through which the device is installed, may be closed by the cover plate 48 which may be smaller than the dial 38 itself. The valve body 62, together with the pilot tube 74 and with the thermally operated device 23, extension 22 and selecting device 25, combined in a unit assembly, is adapted to be inserted into the oven through the opening 54. The opening 110 is preferably positioned to locate the valve member at a point adjacent to the gas supply line to the burner 11, as well as in a zone giving free access to the different points necessary to adjust, and preferably in a position which will be relatively cool while the oven is in service.

From the foregoing it will be apparent that we have provided for employing a thermal sensitive member composed of laminations of metals having different coefficients of expansion in such a way that the thermal sensitive member will occupy a position for functioning without binding or interfering in any way with its free warping properties or free action.

More specifically, the thermal sensitive element is constrained by and along the paths of action of the adjusting and motion transmitting means. In addition, the amount of thermal sensitive metal is reduced and, at the same time, the movement or action of the thermal sensitive member is harnessed in a manner which provides the maximum movement necessary for manipulating the gas valve or other controlling device so that the valve travel speed will be high, assuring action with a short heating period and providing for an abrupt closing off of the heating medium when the desired temperature has been attained. All of this is provided without the use of reduction gears or threads, the latter of which are not found with the desired pitch in standard supplies. The thermal sensitive member is not deformed in any way by warps, bends, twists, and no variables are introduced and the device may be accurately standardized in its movement or action when subjected to heat. The resulting device functions very accurately with the temperature changes and the pin 102 forms, in effect, a fulcrum against which the thermal sensitive member has free abutting contact and over which the lower end of the thermal sensitive member acts with the temperature changes.

We do not intend to be limited to the precise details shown or described, nor to the particular illustrated application of the invention.

We claim:—

1. In combination, a thermally sensitive member, selecting means having free abutting contact with one end of said member, means actuated by said member and in free abutting contact with the opposite end thereof, and constraining means in free abutting contact with said thermally sensitive member intermediate the free abutting contacts of said selecting and actuated means therewith, said constraining means forming a fulcrum about which said thermally sensitive member is adapted to rock.

2. In combination, a thermally sensitive member, selecting means having free abutting contact with one end of said member, means actuated by said member and in free abutting contact with the opposite end thereof, constraining means in free abutting contact with said thermally sensitive member intermediate the free abutting contacts of said selecting and actuated means therewith, said constraining means forming a fulcrum about which said thermally sensitive member is adapted to be rocked in one direction by said selecting member, and means associated with said actuated means for yieldingly rocking said thermally sensitive member in the opposite direction about said fulcrum.

3. In combination, a thermally sensitive member, selecting means having free abutting contact with one end of said member, means actuated by said member and in free abutting contact with the opposite end thereof, constraining means in free abutting contact with said thermally sensitive member intermediate the free abutting contacts of said selecting and actuated means therewith, said constraining means forming a fulcrum about which said thermally sensitive member is adapted to be rocked in one direction by said selecting member, and means associated with said actuated means for yieldingly rocking said thermally sensitive member in the opposite direction about said fulcrum, said last means yieldingly maintaining the free abutting contacts of said thermally sensitive means with said selecting means and with said actuated means and said constraining means.

4. In a thermally operated device, a thermal sensitive member, means for adjusting the action of said thermally sensitive member, means for transmitting the action of said thermal sensitive member therefrom, and means fulcruming said thermal sensitive member between said adjusting means and said transmitting means.

5. In a thermally operated device, a thermal sensitive member, means extending across one side of said thermal sensitive member between the ends of same and confining said member in position, means for transmitting the action of said thermal sensitive member therefrom, said transmitting means having free abutment with said thermal sensitive member on one side of said confining means, and an adjusting device having free aboutment with the thermal sensitive member on the opposite side of said confining means.

6. In combination, a thermally sensitive member, means actuated thereby, means for adjusting said member, and means between the actuated means and the adjusting means for fulcruming said member independently of said adjusting means.

7. In a thermally operated device, a thermal sensitive member, means cooperating with one side of said thermal sensitive member for confining said member in position, and an adjusting device and motion transmitting means cooperating with the opposite side of said thermal sensitive member on opposite sides of said confining means.

8. In a thermally operated device, a thermal sensitive member, means cooperating with one side of said thermal sensitive member for confining said member in position, an adjusting device and motion transmitting means cooperating with the opposite side of said thermal sensitive member on opposite sides of said confining means, said transmitting means comprising a pivoted arm, and a conveyor cooperating with said arm and shiftable longitudinally thereby.

9. In a thermally operated device, a thermal sensitive member, means cooperating with one side of said thermal sensitive member for confining said member in position, an adjusting device and motion transmitting means cooperating with the opposite side of said thermal sensitive member on opposite sides of said confining means, said transmitting means comprising a pivoted arm, and means cooperating with said arm and shiftable longitudinally thereby.

10. In a thermally operated device, a support, a thermal sensitive member, means cooperating with one side of said thermal sensitive member for confining said member in position, an adjusting device and motion transmitting means cooperating with the opposite side of said thermal sensitive member on opposite sides of said confining means, the thermal sensitive member having an opening at one end and said adjusting device comprising a spindle having threaded engagement with said support and reduced at the end adjacent the thermal sensitive member with the reduced end entering the opening in said member, and a shoulder on said spindle adjacent said reduced end for cooperating with the thermal sensitive member adjacent said opening.

11. In a thermally operated device, a generally rectangular elongated thermal sensitive member, means extending across one side of said thermal sensitive member between the ends thereof for confining said member, an adjusting device having free abutment with one end of the thermal sensitive member for adjusting the action of said member, a pivoted arm cooperating with the opposite end of said thermal sensitive member, and a conveyor cooperating with said arm and shiftable longitudinally thereby.

12. In a thermally operated device, a relatively rigid thermal sensitive strip having an eye, an adjusting device therefor, said thermal sensitive strip being loosely suspended from said adjusting device by means of said eye, a controlling device, and means for transmitting the action of said thermal sensitive strip from said strip to said controlling device, said thermal sensitive strip being adapted for transmitting to said controlling device the action of said adjusting device.

13. In a thermally operated device, a controlling member, a thermal sensitive member, a selecting device, a motion transmitting device, said thermal sensitive member being adapted for transmitting to said controlling device the action of said selecting device, and means for constraining said thermal sensitive member by free abutting contact of said member with said selecting device and with said motion transmitting device, said thermal sensitive member having free abutting contact with said constraining means in one direction only throughout the entire range of operation of the device and being at all times free of said constraining means in the opposite direction and in directions normal thereto.

14. In a thermally operated device, a thermal sensitive member having an aperture adjacent its upper end, a selecting device having a spindle with a reduced end entering said aperture and loosely suspending the thermal sensitive member from said spindle, and means for transmitting the action of said thermal sensitive member therefrom, said transmitting means cooperating with the same side of the thermal sensitive member with which said spindle cooperates and constraining means cooperating with the opposite side of said thermal sensitive member between the place of cooperation of the spindle and transmitting means therewith.

15. In a thermally operated device, a thermal sensitive member having an aperture adjacent its upper end, a selecting device having a spindle with a reduced end entering said aperture and suspending the thermal sensitive member from said spindle, means cooperating with the opposite end of the spindle for transmitting the action of said thermal sensitive member therefrom, and a fulcrum for said thermal sensitive member disposed between the point of cooperation of the thermal sensitive member with said transmitting means and the suspended end of said member.

16. In combination, a selecting device having a spindle adapted to be turned, a dial on said spindle, and a washer having serrations struck out of the plane of the washer from the opposite sides thereof and cooperating with the dial and with the spindle for securing the dial against turning movement relative the spindle.

17. In combination, a selecting device having a spindle adapted to be turned, a dial on said spindle, a washer having serrations struck out of the plane of the washer from the opposite sides thereof and cooperating with the dial and with the spindle for securing the dial against turning movement relative the spindle, and means for clamping the dial in cooperation with said serrated washer means, said clamping means being adapted to be released to permit turning of the dial relative the spindle.

18. In combination, an adjusting device having a spindle adapted to be turned, a shoulder on said spindle, a dial on said spindle, a knob for turning said spindle, a pair of washers one between the dial and the knob and the other between the dial and the shoulder on the spindle, said washers having serrations struck out of the planes of the washers for biting engagement with the dial, knob and shoulder, and means having threaded engagement with the spindle for clamping the knob against the shoulder with the dial and washers therebetween.

19. In combination, a thermal sensitive member, means having spaced apart free abutting contacts with one side only of said member throughout the range of operation thereof, and means having free abutting contact with the opposite side only of said member between the spaced apart free abutting contacts of said first means therewith and throughout the range of operation of said member one of said abutting contacts being with a selecting device and another of said abutting contacts being with an actuating device, and said member being constrained throughout its range of operation by said free abutting contacts.

20. In combination, a thermal sensitive member, means having spaced apart free abutting contacts with one side only of said member throughout the range of operation thereof, means having free abutting contact with the opposite side only of said member between the spaced apart free abutting contacts of said first means therewith and throughout the range of operation of said member, one of said free abutting contacts being with an actuating device for transmitting the action of the thermal sensitive member therefrom and another of said free abutting contacts being with a selecting device for adjusting the action of the thermal sensitive member, said member being constrained throughout its range of operation by said free abutting contacts, and means yieldingly maintaining said free abutting contacts with said thermal sensitive member.

21. In combination, a support, an adjusting member threaded in said support, an arm pivoted on said support, a constraining member on the support between said adjusting member and said arm, and a thermal sensitive member having free abutting contact at opposite ends with said adjusting member and with said arm and in abutting contact with said constraining member intermediate the free abutting contacts with said adjusting member and said arm.

22. In combination, a support, an adjusting member threaded in said support, an arm pivoted on said support, a constraining member on the support between said adjusting member and said arm, a thermal sensitive member having free abutting contact at opposite ends with said adjusting member and with said arm and in abutting contact with said constraining member intermediate the free abutting contacts with said adjusting member and said arm, and means yieldingly maintaining said free abutting contacts.

23. In combination, a valve, a stem for actuating said valve, a thermal sensitive device comprising a generally flat bi-metallic strip disposed approximately in parallelism with the axis of said valve stem, and a bell crank member freely engaging one end of said valve stem and also freely engaging one side of said bi-metallic strip and pivoted to transmit the action of said strip to said stem.

In witness whereof, we hereunto subscribe our names this 7th day of August, 1929.

OSCAR J. LEINS.
CLARENCE WANTZ.